United States Patent Office 3,033,474
Patented May 8, 1962

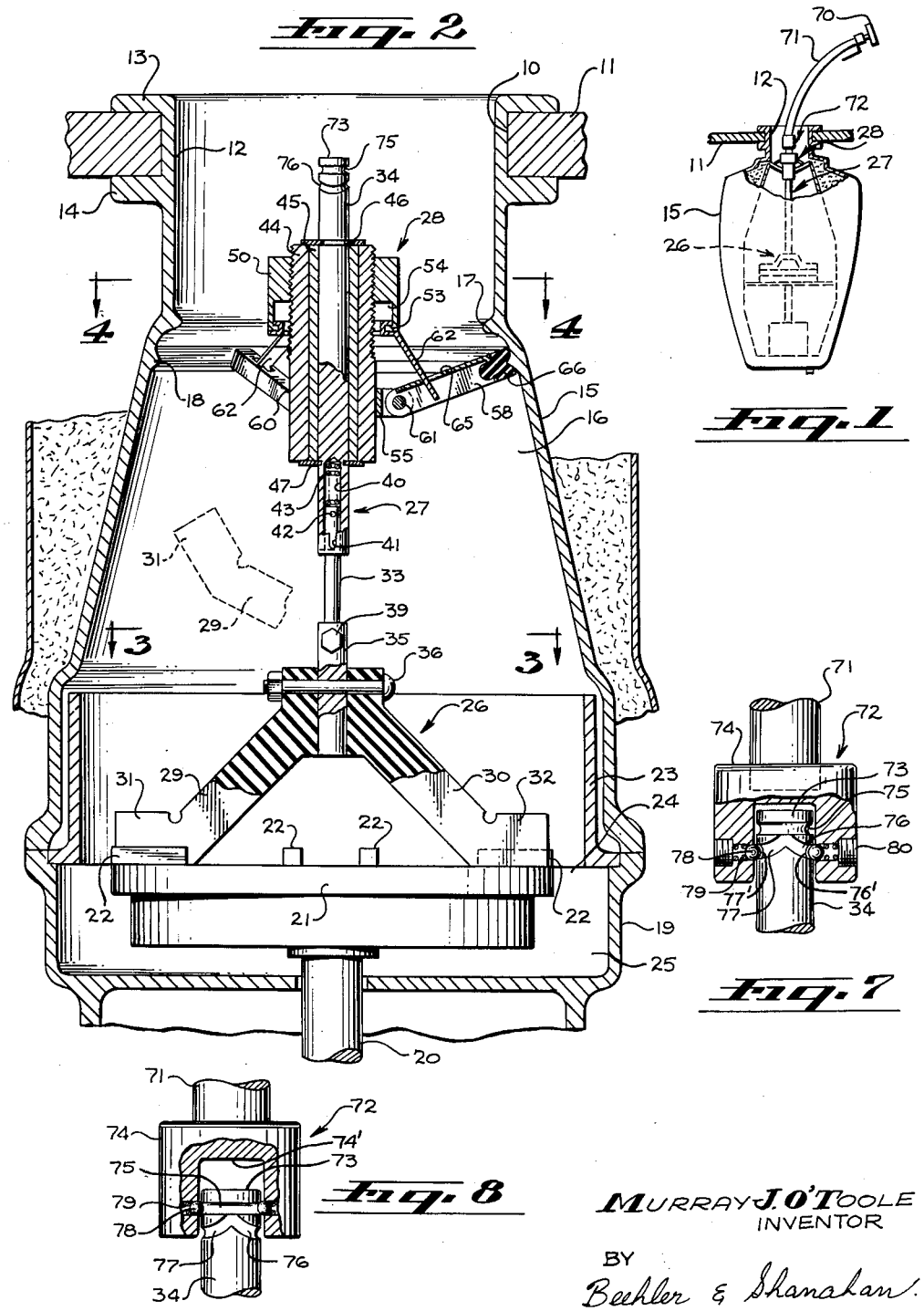

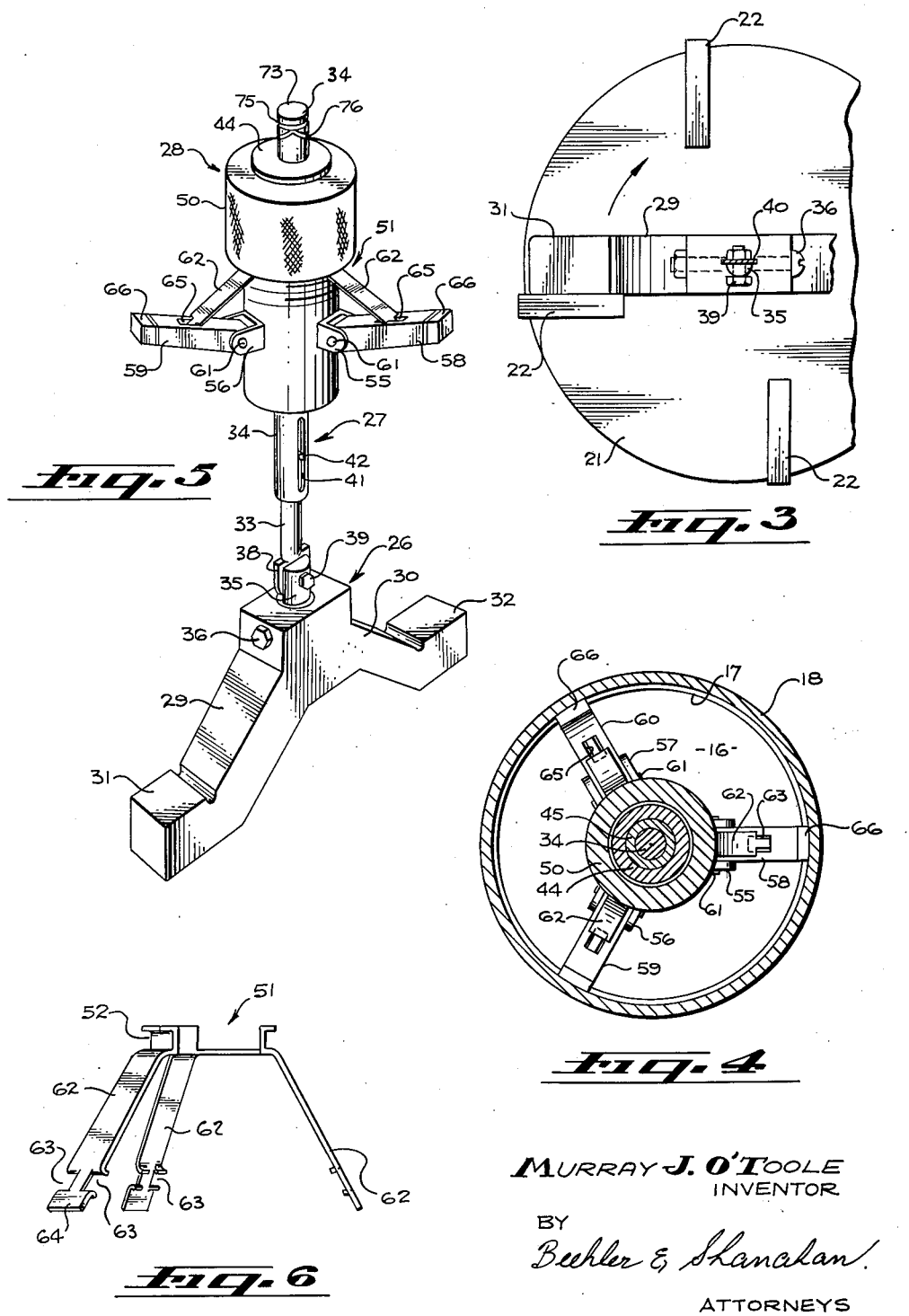

3,033,474
POWER TAKE OFF FOR DISPOSAL UNIT
Murray J. O'Toole, 1400 Ave. H-13W, Lancaster, Calif.
Filed May 27, 1960, Ser. No. 32,225
6 Claims. (Cl. 241—101)

The invention relates to power appliances of a type convenient for use in the customary home kitchen. More particularly the invention relates to a power take-off which can be attached to a permanently installed refuse disposal unit so as to employ the power ordinarily used for operation of the unit to operate any one of a variety of kitchen appliance devices which the housewife may find it convenient to use around the area of the kitchen sink.

During more or less the past decade great emphasis has been placed upon providing power appliances for use in the ordinary household kitchen. The most common practice is to provide each individual appliance with its own self-encased motor so that the appliance and its power unit comprise one single piece of apparatus suitably enclosed in an attractive casing which can be stored when not in use. In point of fact, the appliances individually often require only a modest mounting but on the contrary often need a relatively abundant amount of power. When each unit is supplied with its own power plant the number of individual units often becomes excessive and the storage problem becomes an appreciable one.

It is, accordingly, one of the objects of the invention to provide a new and improved attachment by means of which power can be taken off a permanently installed refuse disposal unit in such fashion that a driven shaft or an extension thereof can be led from the unit outwardly to some convenient counter location where any one of a number of appliances can be attached to it.

Another object of the invention is to provide a new and improved power take off attachment adapted for connection to any one of a great variety of refuse disposal units normally installed in the sink, the take off attachment being such that it can be readily and easily mounted in operating position by projecting it through the drain throat where the disposal unit is mounted and there anchored in operating position by a single simple adjustment.

Another object of the invention is to provide a new and improved power take off device for use with already installed appliance units such, for example, as a refuse disposal unit, which can make full use of the power plant of the unit at a handy location and which more particularly can be employed with cutting units, shredding units, peeling units and the like in the sink area while leaving the throat of the drain passage open so that as scraps of food accumulate they can be continuously passed to the refuse disposal device and thereby disposed of as a continuous operation.

Still further among the objects of the invention is to provide a torque limit connection or safety connection between the power take off and the flexible drive for any one of a number of appliances of such character that should the appliance become jammed for any reason or should the hand or glove of the operator become caught in the appliance the safety device will become operative to relieve any torque strain on the appliance automatically and without necessity for immediately shutting off operation of the power.

Still further among the objects of the invention is to provide a new and improved power take off device for refuse disposal units which is compact in its structure making it both easy to install and easy to store and which is sufficiently versatile to enable it to be used with all types of disposal units as well as various and sundry types of appliances which might be driven thereby.

With these and other objects in view, the invention consists of the construction, arrangement and combination of the various parts of the device whereby the objects contemplated are attained, as hereinafter set forth, pointed out in the appended claims, and illustrated in the accompanying drawings.

FIGURE 1 is a side elevational view of a typical disposal unit partially broken away to show the manner in which the take-off device may be used.

FIGURE 2 is a longitudinal sectional view showing the power take-off device mounted in a typical refuse disposal unit.

FIGURE 3 is a fragmentary cross-sectional view taken on the line 3—3 of FIGURE 2.

FIGURE 4 is a cross-section view taken on the line 4—4 of FIGURE 2.

FIGURE 5 is a perspective view of the power take-off device alone.

FIGURE 6 is a side elevational view of a mounting spider spring used in the upper portion of the device.

FIGURE 7 is a longitudinal view of an automatic releasable connection between the power take-off device and a flexible appliance shaft partially broken away showing the character of the connection in normal operating position.

FIGURE 8 is a view similar to FIGURE 7 showing the condition of the connection when an appliance attached to the appliance shaft has been jammed for any reason.

In an embodiment of the invention chosen for the purpose of illustration there is shown what may be described as a typical refuse disposal unit or garbage disposal unit adapted for attachment in a drain hole 10 of a bottom 11 of a conventional sink. As is typical of devices of this kind, the unit chosen for illustration has a casing 15 provided with a receiving throat 12 having flanges 13 and 14 which overlie upper and lower sides of the sink bottom. The casing 15 extends downwardly from the throat portion to form a chamber 16 in communication with the throat. An annular rim 17 is usually provided at the junction of the throat with the chamber and this in most instances is made use of as a stop for the mounting of a strainer and stopper, not shown, with which the unit is normally provided. Should occasion permit, a special rim 18 may be provided at the junction of the throat with the casing to be used in mounting the power take-off device. The casing is normally provided with a bottom section 19 into which extends a drive shaft 20 from a motor (not shown), the drive shaft being provided with a cutter or shredder head 21 having lugs 22 thereon for throwing refuse outwardly against the wall of a shell 23 from which it passes downwardly through an opening 24 into a disposal chamber 25 where it is ultimately led off into the drain by means not shown.

The power take-off device adapted for use with a type of disposal unit hereinabove described consists of a foot piece 26 for engagement with the cutter head, a driven shaft assembly 27 mounted thereon, and a mounting assembly 28 for securing the power take-off device in operating position.

The foot piece in the chosen embodiment is provided with two legs 29 and 30 which extend obliquely outwardly and downwardly, as viewed in FIGURES 2 and 5, and having thereon respectively feet 31 and 32 which ride upon the upper face of the cutter head 21 in a position where in operation they are engaged by the lugs 22.

The drive shaft assembly comprises essentially a lower shaft element 33 and an upper shaft element 34 joined together by an endwise movable non-rotatable connection. For mounting the drive shaft assembly upon the foot piece there is provided a stub shaft 35 retained at the mid-portion by means of a bolt 36. The stub shaft extends above the foot piece and is pivotally attached to a plate 38 on the lower end of the shaft element 33 by means of bolt 39. Mounted in this fashion the foot piece can be tilted about the axis of the bolt 39 to a position wherein the feet 31 and 32 are more or less parallel to the drive shaft assembly in order that the foot piece can readily be inserted through the throat 12 into the chamber 16 where the foot piece swings then about the bolt to the position illustrated in FIGURES 2 and 5.

The upper shaft element 34 has a recess 40 therein for reception of the upper end of the lower shaft element 33, in the position illustrated in FIGURE 2. Slots 41 extending axially at the sides of the recess receive a pin 42 and a spring 43 bottoming in the recess 40 normally urges the lower shaft element downwardly. Engagement of the pin 42 with the walls of the slots provides a non-rotatable connection between the shaft elements but permits endwise restrained movement of one with respect to the other.

The upper shaft element 34 is rotatably contained within a collar 44 by employment of a bushing 45, snap rings 46 and 47 being provided at the outer and inner ends for confining the shaft element against axial movement with respect to the collar. The snap rings 46 and 47 extend radially outward from the shaft element beyond the inside cylindrical surface of the collar whereby the collar is restrained from endwise (axial) movement relative to the shaft element. The outer shaft element 34 is adapted to rotate freely within the bushing 45.

To mount the collar and hence the drive shaft in operating position there is provided a mounting nut 50 which threadedly engages the outer end of the collar 44, as shown to good advantage in FIGURE 2. A spider 51, shown in perspective in FIGURE 6, is rotatably attached to the mounting nut 50 by means of three tabs 52 at the upper portion of the spider being received in an annular flange 53 at the lower end of the nut. The connection is made as an interior connection partially within an annular chamber 54 in order to minimize obstructions which might otherwise impede the passage of refuse through the throat.

Brackets 55, 56 and 57 may be provided on the exterior of the collar 44 for mounting respectively arms 58, 59 and 60 by employment of pins 61 so that the arms pivot about the brackets. The spider 51 has three identical legs 62, each in turn being provided with a recess 63, as clearly shown in FIGURE 6, and a lower end 64. The lower end in each instance protrudes through a slot 65 in each respective arm so that the walls of the slot in each instance are received in the recesses 63 whereby to form a sliding connection between the arms and the legs 62 of the spider. A rubber or plastic tip 66 is preferably provided at the outer end of each of the arms in order to make a friction engagement with either the rim 18 or the rim 17, depending on the manner in which the device is mounted.

When the device is to be mounted in operating position the nut 50 is screwed outwardly so as to partially collapse the positions of the arms 58, 59 and 60. The foot piece is then tilted in the manner heretofore described and inserted into the chamber to the position shown in FIGURE 2. When this has been accomplished, the nut 50 is screwed inwardly i.e. downwardly in the throat 12, thereby to extend all of the arms radially outwardly until they engage in contact with one of the rims 17 or 18. When this is accomplished, the nut is screwed still further inwardly upon the collar 44 which has the effect of drawing the collar upwardly with respect to the nut and hence drawing the pins 61 in an upward direction, thereby to extend the arms radially outward into engagement with a rim and to anchor and center the drive shaft assembly in position. Action of the spring 43 pushes the foot piece downwardly so that the feet 31 and 32 stay in a position of engagement with the lug 22. The device is then ready for operation.

When the device is to be removed, it is necessary only to unscrew the nut 50, collapsing the positions of the arms 58, after which the device can be drawn outwardly through the throat, accompanied by the same tilting of the foot piece as was employed when it was installed.

Representing a typical attachment for the device is a paring wheel 70 attached at the outer end of a flexible appliance shaft 71, as shown in FIGURE 1. The connection can be made by employment of a releasable connection indicated generally by the reference character 72, the releasable connection also serving as a torque safety device. To make the connection the outer shaft element 34 may be considered as provided with a connecting end 73 and the flexible shaft 71 may be considered as provided with a connecting end embodied in a socket or bushing 74 having a cavity or bore 74′ formed therein for receiving the connecting end portion 73 of the outer shaft 34. An annular groove 75 is cut in the connecting end 73 and this is joined by two oblique perimetral grooves 76 and 77, as shown in FIGURES 7 and 8. Balls 78 spring pressed by springs 79 are held in position by screw plugs 80. The connection may be made by pressing the bushing 74 over the connecting end 73, whereupon the balls retract under spring tension until they fall within drive detent pockets 76′ and 77′ of the perimetral grooves 76 and 77. In this position, when the driven shaft is rotated, the balls bearing upon the spherical detent pockets of the oblique perimetral grooves will cause the flexible shaft 71 to be rotated by the driven shaft. Should the wheel be jammed for any reason, the balls will slip into the groove 75 at the junction of the oblique perimetral grooves with the annular groove 75. Since the annular groove offers no resistance to the balls, even though spring-pressed into position, the upper shaft element can then continue to rotate under power but will spin freely relative to the appliance shaft 71 and no torque will be exerted by the appliance shaft upon any appliance attached thereto. Hence, if the finger or hand might be jammed by a tool, the pressure will be released and a minimum of damage will result. As soon as the power is cut off, the releasable connection can then be forced into its original position, after which the appliance shaft is then ready for operation.

From the description just given, it will be apparent that the releasable torque connection serves simultaneously as a releasable connection and a safety feature.

Although the device just described has been shown connected to one specific disposal unit, it will be clear that the flexibility of the connection and the adjustable character of the spider mechanism is such that the same power take-off is equally well adapted to virtually all styles and sizes of disposal units currently in use. The device, moreover, is simple mechanically so that it is inexpensive to manufacture and easy for persons not specially skilled in mechanics to install and operate. A further material advantage lies in the fact that the take-off attachment is compact and can be conveniently stored when not in use.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In a power take-off device for use with a refuse disposal unit having a casing with an upper end opening and a rotary cutter element in the casing the combination of a foot piece adapted to be drivingly engaged with said cutter element; a driven shaft extending upwardly from the foot piece, a collar rotatably mounted on said driven shaft, retaining means between the shaft and the collar restraining said collar from endwise movement relative to the shaft, a mounting nut in threaded engagement with the outside surface of the collar, a spider having a plurality of legs extending radially outward and downward from the nut and being in rotatable engagement with said nut, and a plurality of mounting arms equal in number to said legs and pivotally secured to the collar and extending in a generally radial direction from the collar, said arms being connected to the lower ends of said spider legs respectively whereby the arms are adapted to be extended radially outward into engagement with the inside surface of said casing upon the shifting of said nut along said collar to mount the device in the disposal unit.

2. In a power take-off device for use with a refuse disposal unit having a casing defining a receiving throat at the upper end thereof and a refuse chamber in communication with the throat, and a power actuated cutter head in the chamber, the combination of a foot piece adapted to extend to a position of driven engagement with said cutter head, a driven shaft extending upwardly from the foot piece, a collar rotatably mounted on said driven shaft, retaining means between the shaft and the collar restraining said collar from endwise movement relative to the shaft, a mounting nut in threaded engagement with the outside surface of the collar, and extendable mounting means on the nut and secured to the collar and comprising a plurality of arms extending in a generally radial direction from the collar, said arms being extendable to a position of sliding engagement with the receiving throat upon the shifting of said nut along said collar in a direction axially of the collar to mount the device in the disposal unit.

3. In a power take-off device for use with a refuse disposal unit having a casing defining a receiving throat at the upper end thereof and a refuse chamber below and in communication with the throat, and a power actuated cutter head in the chamber, the combination of a foot piece having downwardly and radially outwardly extending legs for driven engagement with said cutter head, a driven shaft assembly extending upwardly from the foot piece, said shaft assembly comprising a first shaft element non-rotatably secured to the foot piece and a second separate shaft element in axial alignment with the first shaft element, one of said shaft elements having an axial recess receptive of the other shaft element, means connecting said shaft elements with an axially slidable and non-rotatable connection and spring means in said recess normally urging said shaft elements in a direction axially away from each other, a collar rotatably mounted on said second shaft element, retaining means between the second shaft element and the collar restraining said collar from endwise movement relative to the second shaft element, a mounting nut in threaded engagement with the outer end of the collar, and extendible mounting means on the nut and secured to the collar and comprising a plurality of arms extendible in directions radially outward from the collar and retractable in response to relative axial movement between the nut and the collar whereby said mounting means is adapted to be wedged into engagement with said throat upon the shifting of said nut along said collar to mount the device in the disposal unit.

4. In a power take-off device for use with a refuse disposal unit having a casing defining a receiving throat and a refuse chamber below and in communication with the throat, and a power actuated cutter head with lugs thereon, the combination of a foot piece adapted to extend to a position of driven engagement with said cutter head, a driven shaft assembly extending upwardly from the foot piece, a collar rotatably mounted on said driven shaft assembly, retaining means between the shaft assembly and the collar restraining said collar from removal from the shaft assembly and a resilient retaining means forming part of the shaft assembly normally urging opposite ends of said shaft assembly away from each other, a mounting nut in threaded engagement with the outside surface of the collar, a spider having a bearing track in rotatable engagement with said nut, and legs on the spider adapted in assembled position to extend in directions obliquely downward and radially outward with respect to the receiving throat, a plurality of mounting arms equal in number to said spider legs, said arms being pivotally secured to the collar and extending in a generally radial direction from the collar, each said arm having a longitudinally extending slot and the respective spider leg having a recessed end slidably engaged with the arm in the slot whereby the outer ends of the arms are adapted to be wedged into engagement with said throat upon the shifting of said nut along said collar to mount the shaft assembly in the disposal unit.

5. In a power take-off device for use with a refuse disposal unit having a casing defining a receiving throat, and a refuse chamber below and in communication with the throat, an annular rim at the junction of the throat and the chamber and a power actuated cutter head with lugs thereon in said chamber, the combination of a foot piece having legs adapted to extend to a position of driven engagement with said cutter head and the lugs thereon, a driven shaft assembly extending upwardly from the foot piece and a non-rotatable pivotal connection therebetween enabling said foot piece to tilt to a position adapted for insertion through said throat into the chamber, a flexible appliance shaft and a releasable connection between said appliance shaft and said driven shaft assembly, a collar rotatably mounted on said driven shaft assembly, retaining means between the shaft assembly and the collar restraining said collar from endwise movement relative to the shaft assembly and a resilient means normally urging opposite ends of the shaft assembly away from each other, a mounting nut in threaded engagement with the outside surface of the collar, a spider having a bearing track in rotatable engagement with said nut and legs of the spider adapted to extend obliquely downwardly and radially outwardly with respect to the receiving throat, and mounting arms pivotally secured to the collar and extending in a generally radial direction therefrom, said arms having a sliding engagement with the legs of the spider whereby the arms are adapted to be wedged into engagement with said annular rim at said junction upon the shifting of said nut along said collar to mount the driven shaft assembly in operating position; said releasable connection comprising a connecting end portion of one of said shafts, an annular groove on said connecting end portions adjacent the extremity thereof, a pair of obliquely extending perimetral grooves on said connecting end portion in communication with said annular groove, a bushing on the other shaft having a cavity receiving said outer extremity of said one connecting end and a pair of oppositely located spring-pressed balls in the bushing exposed to said cavity adapted to ride normally in the obliquely extending grooves and being shiftable during operation to positions in the annular groove upon the blocking of rotation of said appliance shaft whereby said driven shaft is enabled to rotate freely without resistance.

6. In a power take-off device for use with a refuse disposal unit having a casing defining an upper end opening for the unit and a refuse chamber in the unit and a power actuated cutter head in the chamber, the combination of a foot piece adapted to extend to a position of driven engagement with said cutter head, a driven shaft extending upwardly from the foot piece, means for rotatably supporting the driven shaft axially in the casing, an appliance shaft, two coupling members for releasably interconnecting said shafts, one of said coupling members being a socket secured on an end of one shaft and having an inside surface defining an open and axially extending cavity of circular cross-section formed therein, the other of said coupling members being an end portion of the other shaft and having an outside surface of circular cross-section, said end portion being receivable axially in said socket cavity, one of said coupling members having a circumferentially continuous groove formed therein and open to its said surface and disposed in a plane perpendicular to the axis of said driven shaft, said one coupling member having an obliquely directed circumferentially extending groove formed therein and disposed in a plane at an angle with respect to the plane of said circumferentially continuous groove, said oblique groove intersecting said continuous groove, said one coupling member having a pocket portion formed therein open to said oblique groove and being deeper than the oblique groove, said pocket portion being spaced axially from said continuous groove, the other coupling member having a spring pressed ball exposed to said cavity and adapted to extend normally into said pocket and being shiftable from a position of engagement in said pocket through said oblique groove and into said continuous groove upon the blocking of rotation of said appliance shaft whereby said driven shaft is enabled to rotate freely without resistance.

References Cited in the file of this patent
UNITED STATES PATENTS

| | | |
|---|---|---|
| 2,579,393 | Modrey | Dec. 18, 1951 |
| 2,675,968 | Dunbar | Apr. 20, 1954 |
| 2,869,794 | Modrey | Jan. 20, 1959 |
| 2,933,964 | Wittlin | Apr. 26, 1960 |